(12) United States Patent
Tokieda et al.

(10) Patent No.: US 10,414,330 B2
(45) Date of Patent: Sep. 17, 2019

(54) VEHICLE SIGNALING LIGHT WITH PLATE LIGHT GUIDING LENS

(71) Applicant: Stanley Electric Co., Ltd., Tokyo (JP)

(72) Inventors: Yuki Tokieda, Tokyo (JP); Kazuya Furubayashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 188 days.

(21) Appl. No.: 15/410,557

(22) Filed: Jan. 19, 2017

(65) Prior Publication Data

US 2017/0205044 A1 Jul. 20, 2017

(30) Foreign Application Priority Data

Jan. 19, 2016 (JP) .................................. 2016-008246

(51) Int. Cl.
| | |
|---|---|
| *B60Q 1/26* | (2006.01) |
| *F21S 43/31* | (2018.01) |
| *F21S 43/20* | (2018.01) |
| *B60Q 1/34* | (2006.01) |
| *F21S 43/14* | (2018.01) |

(Continued)

(52) U.S. Cl.
CPC ............ *B60Q 1/2607* (2013.01); *B60Q 1/34* (2013.01); *F21S 43/14* (2018.01); *F21S 43/239* (2018.01); *F21S 43/241* (2018.01); *F21S 43/243* (2018.01); *F21S 43/249* (2018.01); *F21S 43/26* (2018.01); *F21S 43/31* (2018.01); *F21S 43/315* (2018.01); *F21S 43/40* (2018.01); *F21Y 2115/10* (2016.08)

(58) Field of Classification Search
CPC ....... B60Q 1/2607; B60Q 1/34; F21S 43/249; F21S 43/40; F21S 43/14; F21S 43/243; F21S 43/239; F21S 43/31; F21S 43/315; F21S 43/241; F21S 43/26; F21Y 2115/10
USPC ......................................................... 362/511
See application file for complete search history.

(56) References Cited

U.S. PATENT DOCUMENTS

| | | | |
|---|---|---|---|
| 2006/0062016 A1 | 3/2006 | Dejima et al. | |
| 2009/0237910 A1 | 9/2009 | Takada et al. | |
| 2012/0287668 A1* | 11/2012 | Richardson | ............. F21V 29/00 362/602 |

FOREIGN PATENT DOCUMENTS

| | | |
|---|---|---|
| JP | 2006-93104 A | 4/2006 |
| JP | 2009-223196 A | 10/2009 |
| JP | 2014-154524 A | 8/2014 |

OTHER PUBLICATIONS

English translation of JP 2014154524 A (Aug. 2014).*

* cited by examiner

Primary Examiner — Anh T Mai
Assistant Examiner — Hana S Featherly
(74) Attorney, Agent, or Firm — Kenealy Vaidya LLP

(57) ABSTRACT

A vehicle signaling light includes a first light source, a first plate light guiding lens, a second light source, and a second plate light guiding lens. The first plate light guiding lens includes a light incident portion to receive light from the first light source in a direction parallel to the plate surface and a light output surface through which the light having been guided is allowed to exit, and the light incident portion has upper and lower expanded portions. The second plate light guiding lens receives light from the second light source in a direction perpendicular to the plate surface and causes the light to exit from the light guiding lens in the direction parallel to the plate surface. The first and second plate light guiding lenses are stacked on each other to configure the (Continued)

vehicle signaling light including a turn signaling lamp function and a DRL function.

19 Claims, 6 Drawing Sheets

(51) Int. Cl.
*F21S 43/239* (2018.01)
*F21S 43/241* (2018.01)
*F21S 43/243* (2018.01)
*F21S 43/249* (2018.01)
*F21S 43/40* (2018.01)
*F21Y 115/10* (2016.01)

VEHICLE SIGNALING LIGHT WITH PLATE LIGHT GUIDING LENS

This application claims the priority benefit under 35 U.S.C. § 119 of Japanese Patent Application No. 2016-008246 filed on Jan. 19, 2016, which is hereby incorporated in its entirety by reference.

TECHNICAL FIELD

The presently disclosed subject matter relates to a vehicle signaling light including a light source and a plate light guiding lens that outputs light by being irradiated with light from the light source.

BACKGROUND ART

Recent vehicle signaling lights such as turn signaling lamps, DRL (Day Running Lamp), etc. to be disposed on both right and left end portions of the front and rear areas of a vehicle body have utilized light emitting diodes (LED) and the like light sources, as the LEDs have high light emission efficiency and long life while consuming less power.

The LEDs having the above-described advantageous effects and serving as a light source generally emit light with high directivity. To cope with this, such an LED can be used together with a light guiding lens having an incident surface and a light output surface. In this configuration, the light with high directivity can be first caused to enter into the light guiding lens, and the light output surface of the light guiding lens can be illuminated with the entering light, as if the entire surface thereof can emit light.

For example, Japanese Patent Application Laid-Open No. 2009-223196 (or US Patent Application Publication No. 2009/0237910A corresponding to the JP publication) has proposed an indicator device including an LED and a plate light guiding lens. In this indicator device, light emitted from the LED is caused to enter into the plate light guiding lens in a direction parallel to the plate surface of the light guiding lens and be guided therethrough to the light output surface, thereby outputting the light through the light output surface in the direction parallel to the plate surface. This can illuminate the linear light output surface thereof with the light as if the entire linear surface can emit light.

Furthermore, Japanese Patent Application Laid-Open No. 2014-154524 proposes a vehicle lighting unit including an LED and a plate light guiding lens that can receive light from the LED in a direction perpendicular to the plate surface direction and cause the light to exit in the plate surface direction.

Various illumination devices including the aforementioned indicator device have been required to be thinned in recent years. In order to cope with this demand, for example, in the indicator device proposed in Japanese Patent Application Laid-Open No. 2009-223196 wherein the light is allowed to enter the plate light guiding lens in the direction parallel to the plate surface and to exit in this direction, the LED is also required to be thinned. However, there is a certain limit to thin the thickness of the LED for this purpose. Accordingly, Japanese Patent Application Laid-Open No. 2006-093104 (or US Patent Application Publication No. 2006/062016A corresponding to the JP publication) has proposed an illumination device including an LED 110 and a thin plate light guiding lens 100 as illustrated in FIG. 1. In this illumination device, the thin plate light guiding lens 100 includes a light incident portion 100A opposite to the LED 110 and a light output surface 100b on the opposite side, and the light incident portion 100A includes expanded portions 102 and 103 expanded in the plate thickness direction.

Here, the light incident portion 100A of the light guiding lens 100 can have an elliptical cross section having two focal points F1 and F2 on its optical axis x. The light incident portion 100A includes a light incident surface 100a opposite to the LED 110 and disposed between the focal point F1 and the center of the ellipse. Light L1 emitted from the center of the LED 110 can be incident on the light incident surface 100a of the light guiding lens 100 while being refracted by the light incident surface 100a to enter the light incident portion 100A of the light guiding lens 100 illustrated as light L2. At that time, since the optical path through which the light L2 travels passes through the focal point F1 on the LED 110 side, the light L2 enters the light guiding lens 100 as if the light L2 has been emitted from the focal point F1. The light L2 having entered the light incident portion 100A is totally reflected off the surface of the expanded portion 102 (103) to become reflected light L3, which in turn passes through the focal point F2. Therefore, the light can effectively enter the light guide plate 101 after passing through the focal point F2.

The reflected light L3 enters the main portion of the light guide plate 101 to be light L4. The light L4 can be totally reflected by the inner surface of the light guide plate 101 repeatedly and guided toward the light output surface 100b (on the right side in FIG. 1). Finally, the light L4 can exit through the light output surface 100b, as if the entire light guiding lens 100 can emit light.

In this situation, vehicle lighting units having various signaling lights with different functions housed in a lighting chamber, such as a rear-combination lighting device, have been desired to be miniaturized as a whole by arranging the various signaling lights adjacently.

SUMMARY

The presently disclosed subject matter was devised in view of these and other problems and features and in association with the conventional art. According to an aspect of the presently disclosed subject matter, a vehicle signaling light can achieve the miniaturization of the entire light by arranging the members adjacently.

According to another aspect of the presently disclosed subject matter, a vehicle signaling light can include a first light source, a first plate light guiding lens, a second light source, and a second plate light guiding lens. The first plate light guiding lens can include a light incident portion to receive light emitted from the first light source in a direction parallel to the plate surface direction and a light output surface through which the light having been guided is allowed to exit, and the light incident portion can have an expanded portion. The second plate light guiding lens can receive light emitted from the second light source in a direction perpendicular to the plate surface direction and can cause the light to exit from the light guiding lens in the direction parallel to the plate surface direction. The first and second plate light guiding lenses are stacked on each other.

In the vehicle signaling light, the second light guiding lens can have an outer shape configured to avoid being overlaid on the expanded portion of the first light guiding lens.

In the vehicle signaling light with the above-mentioned configuration, the expanded portion of the first light guiding lens can be composed of upper and lower expanded portions, which can be provided with respective reflective cuts that are configured to reflect light, which is directly incident thereon from the first light source, to the light output surface and located in positions different from each other when seen in a vertical direction.

Furthermore, the light output surfaces of the first and second light guiding lenses can be formed to extend linearly.

Furthermore, the light output surfaces of the first and second light guiding lenses can be provided with a plurality of lens cuts having two side surfaces which extend in a direction of a thickness thereof and one of which are parallel to a direction in which the vehicle signaling light can output light (light output direction) and the other of which are perpendicular to the light output direction.

Since the first and second light guiding lenses having respective different light receiving directions (light incident directions) are stacked on each other in the vehicle signaling light, the vehicle signaling light can be configured by arranging these first and second light guiding lenses adjacently. Conventional vehicle signaling lights having different functions have been separately provided, thereby configuring a combination vehicle signal lights with a large size as a whole. On the contrary, the vehicle signaling light made in accordance with principles of the presently disclosed subject matter can realize the thin profile while having two functional light guiding lenses.

Furthermore, since the second light guiding lens can have the outer shape configured to avoid being overlaid on the expanded portion of the first light guiding lens, the first and second light guiding lenses can be arranged more adjacently, thereby realizing the thinner profile as a single vehicle signaling light having the two functional light guiding lenses.

Furthermore, in the vehicle signaling light with the above-mentioned configuration, the expanded portion of the first light guiding lens can be composed of the upper and lower expanded portions, which can be provided with respective reflective cuts that are configured to reflect light, which is directly incident thereon from the light source, to the light output surface and located in positions different from each other when seen in a vertical direction. This can achieve uniform illumination of the light output surface of the first light guiding lens while preventing uneven illumination due to point illumination.

Furthermore, since the light output surfaces of the first and second light guiding lenses can be formed to extend linearly, the light can be output in a linear shape, so that the intrinsic functions of the vehicle signaling light having the two functional light guiding lenses can be exhibited.

Furthermore, when the light output surfaces of the first and second light guiding lenses are provided with a plurality of lens cuts, the light output through the light output surfaces can be properly diffused by the plurality of lens cuts to achieve uniform illumination thereof. Furthermore, one side surfaces of the lens cuts that are parallel to the light output direction can reflect waste light back to the light guiding lens. This can improve the light utilization efficiency.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle signaling lights of the presently disclosed subject matter with reference to the accompanying drawings in accordance with exemplary embodiments.

Note that directions herein are on the basis of a posture of the vehicle signaling lights when installed in a vehicle body for use, but the front direction means a light output direction even when the vehicle signaling light is installed in a rear portion of the vehicle body to be directed to its rear side.

Figure 1:
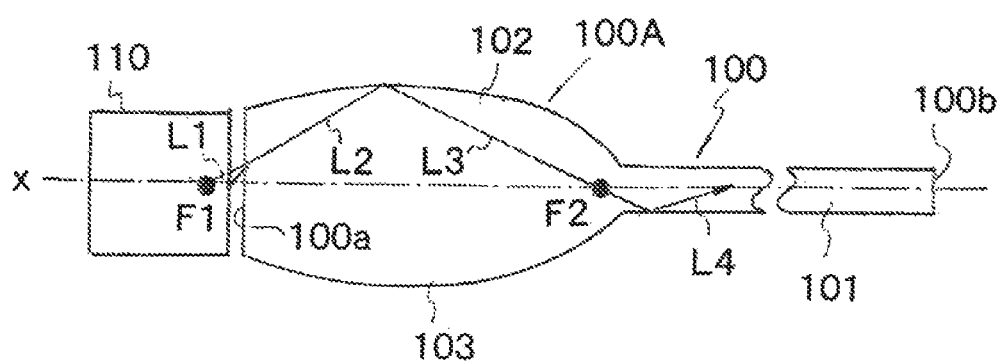
FIG. 1 is a partial cross-sectional view of a light guiding lens proposed in Japanese Patent Application Laid-Open No. 2006-093104 (or US Patent Application Publication No. 2006/062016A corresponding the JP publication)
Figure 2:
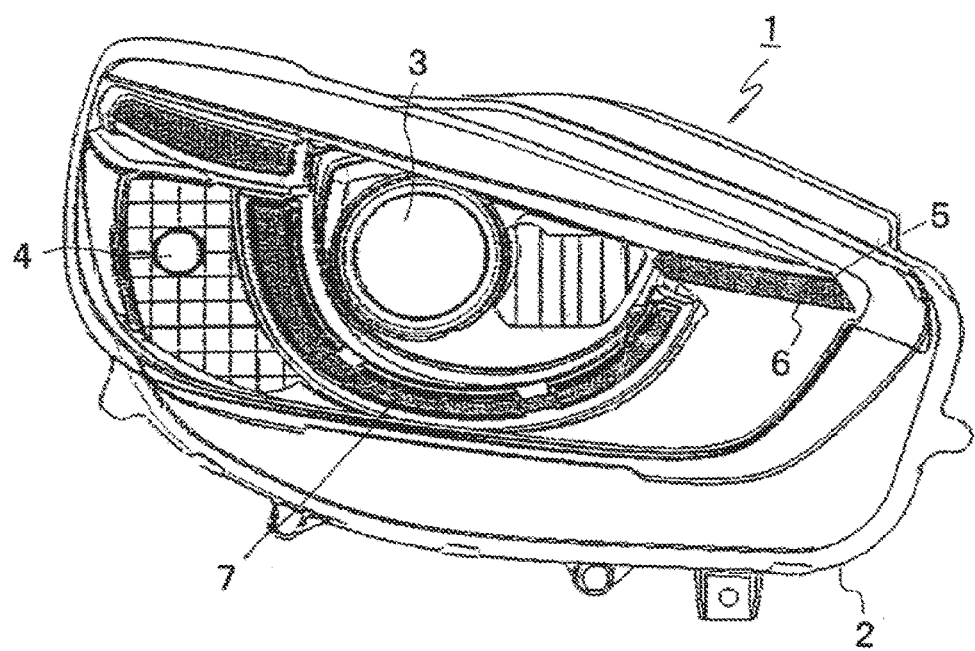
FIG. 2 is a front view of a rear-combination lighting device including a vehicle signaling light made in accordance with principles of the presently disclosed subject matter.
Figure 3:
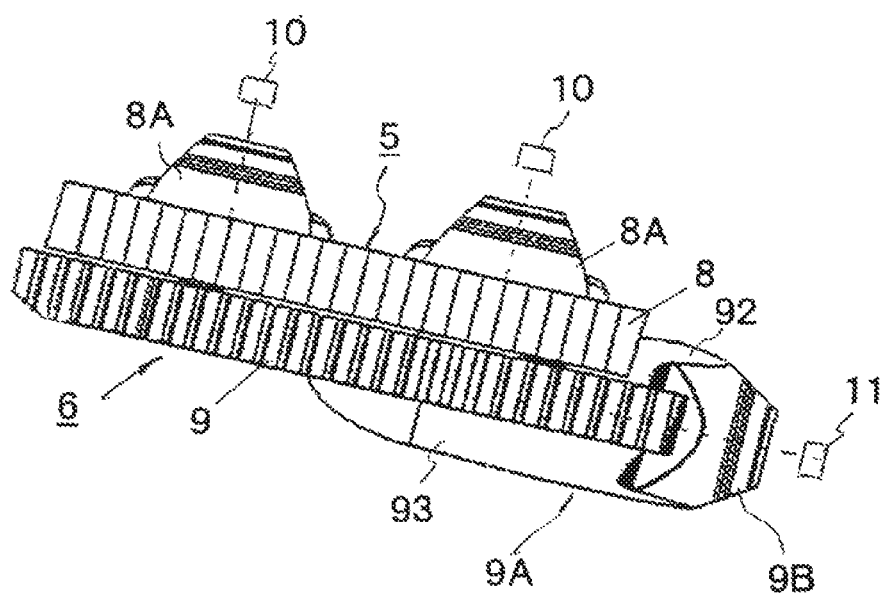
FIG. 3 is a front view of the vehicle signaling light.
Figure 4A:
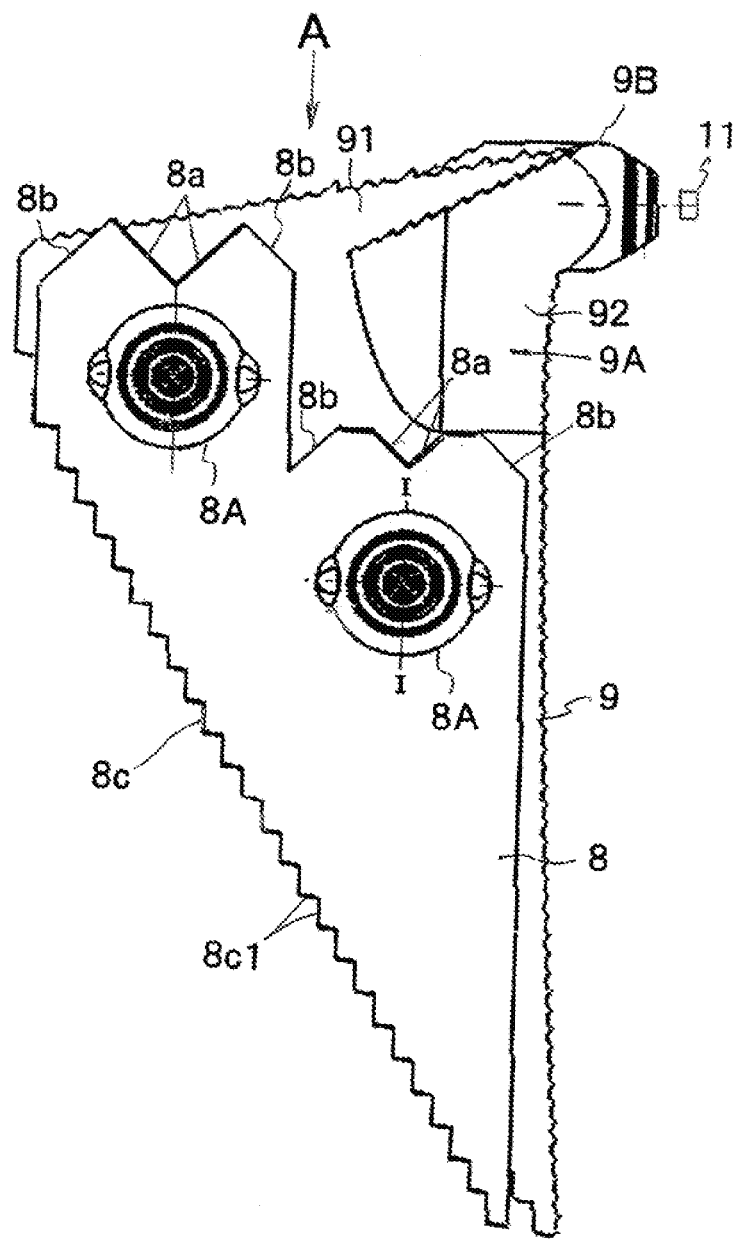
FIG. 4A is a top plan view of respective light guiding lenses of the vehicle signaling light.
Figure 4B:
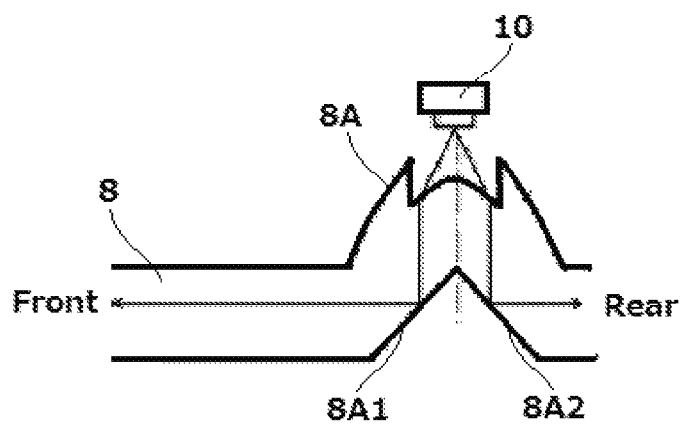
FIG. 4B is a cross-sectional view of a light incident portion taken along line
Figure 5:
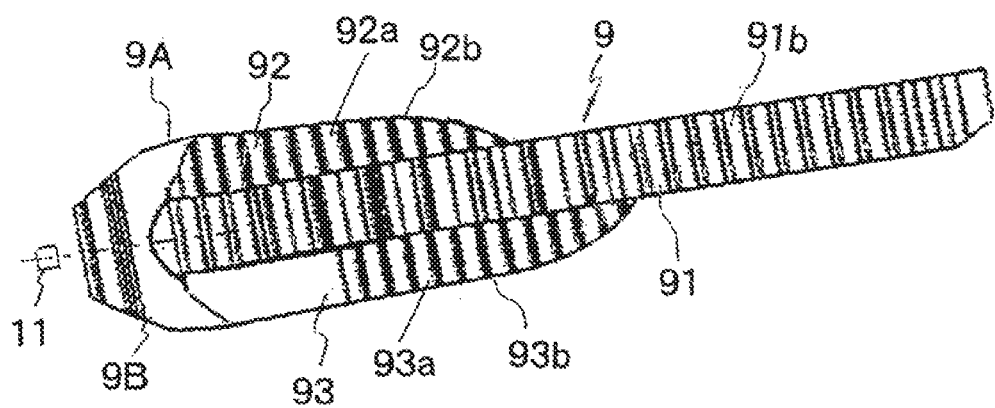
FIG. 5 is a rear view of the light guiding lenses of the vehicle signaling light when seen from an arrow A in FIG. 4A.
Figure 6:
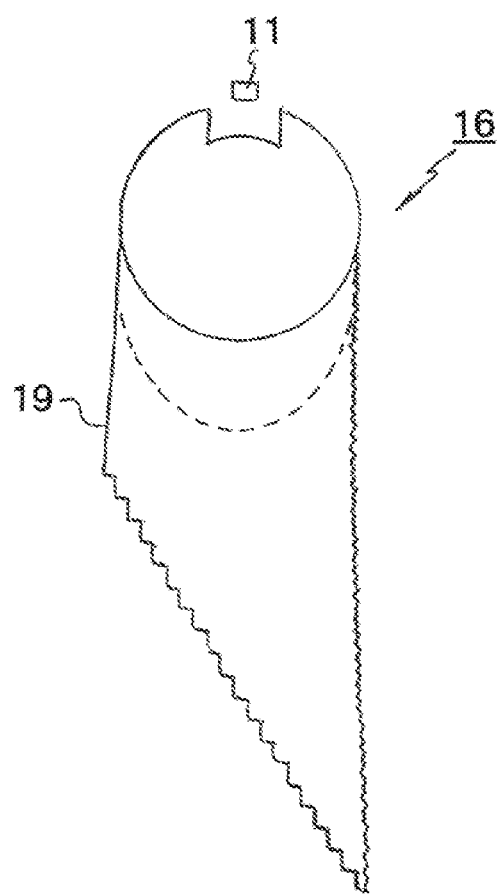
FIG. 6 is a top plan view of one of the light guiding lenses of the vehicle signaling light.

FIG. 2 is a front view of a rear-combination lighting device including a vehicle signaling light made in accordance with the principles of the presently disclosed subject matter FIG. 3 is a front view of the vehicle signaling light, FIG. 4A is a top plan view of respective light guiding lenses of the vehicle signaling light, FIG. 4B is a cross-sectional view of a light incident portion taken along line I-I in FIG. 4A, FIG. 5 is a rear view of the light guiding lenses of the vehicle signaling light when seen from an arrow A in FIG. 4A, and FIG. 6 is a top plan view of one of the light guiding lenses of the vehicle signaling light, The rear-combination lighting device 1 illustrated in FIG. 2 can be a lighting unit to be disposed in a rear portion of a vehicle body on its right and left end sides. The lighting unit to be disposed on the left end side has the same basic configuration as the lighting unit to be disposed on the right end side. Thus, one rear-combination lighting device is illustrated in FIG. 1 as the rear-combination lighting device 1 and will be described and illustrated.

The rear-combination lighting device 1 of FIG. 2 can include a housing having an opening and a not-illustrated transparent outer lens for covering the opening of the housing 2 to define a lighting chamber. Further included in the lighting chamber may be a plurality of lamps having different functions, including a low-beam lamp 3 disposed at its center, a high-beam lamp 4 disposed beside the low-beam lamp 3, a turn signaling lamp unit 5 serving as a signaling lamp and a DRL unit 6 both disposed beside the low-beam lamp 3 on an opposite side to the high-beam lamp 4, and a positioning lamp 7 disposed to surround the low-beam lamp 3 from below. The turn signaling lamp unit 5 and the DRL unit 6 are, as illustrated in FIG. 3, arranged vertically adjacent to each other.

The turn signaling lamp unit 5 and the DRL unit 6 can include plate light guiding lenses 8 and 9, respectively, as illustrated in FIG. 3 to be stacked vertically adjacent to each other. Further included are two LED light sources 10 that can emit light rays in a direction perpendicular to a direction of the surface of the plate light guiding lens 8 (or referred to as a plate surface direction). The light guiding lens 8 of the turn signaling lamp unit 5 on the upper side can be configured to receive the light rays emitted from the two LED light sources 10 in the direction perpendicular to the plate surface direction (from an obliquely upward direction in FIG. 3) and guide the light rays in the plate surface direction (toward the near side in the drawing). Specifically, the light guiding lens 8 can be provided with truncated conical shaped light entrance portions 8A integrally formed with the light guiding lens 8 at two locations of the top surface thereof. The respective LED light sources 10 can be disposed in the vicinities of the respective light entrance portions 8A so that the light output direction of the respective LED light sources 10 are perpendicular to the surface of the plate light guiding lens 8 (directed in obliquely downward direction as illustrated in FIG. 3).

The light guiding lens 8 can be provided with V-shaped sideward reflective surfaces 8a in positions corresponding to the respective light entrance portions 8A and forward reflective surfaces 8b on both sides of the respective V-shaped sideward reflective surfaces 8a. The forward reflective surfaces 8b can be inclined as illustrated in FIG. 4A. Furthermore, the light guiding lens 8 can be provided with a light output surface 8c having a line shape in an oblique surface of the front side of the light guiding lens 8. The linear light output surface 8c can be provided with a plurality of lens cuts 8c1 each having two side surfaces which extend in the direction of the thickness. One of the lens side surfaces is parallel to the light output direction of the vehicle signaling light and the other is perpendicular to the light output direction (meaning that the lens cut 91a1 has a cross section having one side parallel to the light output direction and the other side perpendicular to the light output direction).

In the turn signaling lamp unit 5 including the light guiding lens 8 with the aforementioned configuration, a current is supplied to the LED light sources 10 to emit light rays. Then, light rays emitted from the LED light sources 10 and travelling obliquely and downwardly can be incident on the respective light entrance portions 8A of the light guiding lens 8. The light entrance portion 8A can each include reflective surfaces 8A1 and 8A2, as illustrated in FIG. 4B, for reflecting light rays having entered through the light entrance portions 8A by 90° to direct part of the light rays toward the light output surface 8c (downward direction in FIG. 4A). The other part of the light rays reflected by the reflective surface 8A2 toward the rear surface (upward in FIG. 4A) can reach the sideward reflective surfaces 8a and be reflected by the same by 90° toward the corresponding forward reflective surfaces 8b. Then, the light rays reaching the forward reflective surfaces can be reflected forward (downward in FIG. 4A) toward the light output surface 8c.

Almost all of the light rays toward the light output surface 8c can be projected through the light output surface 8c to the near side in FIG. 4A (downward direction in FIG. 4A). At that time, the plurality of lens cuts 8c1 formed in the light output surface 8c can control the projection direction of the light rays to proper illumination directions (output directions) required as a vehicle signal light. As a result, the entire light output surface 8c of the light guiding lens 8 can be illuminated with light uniformly or can project light uniformly as if it emits light in a linear fashion. This can achieve the exhibition of the intrinsic function of the turn signaling lamp unit 5.

The light guiding lens 9 of the DRL unit 6 on the lower side can output light by receiving light rays emitted from one LED light source 11 in a direction parallel to the plate surface direction and guiding and outputting the light rays in the direction parallel to the plate surface direction (on the near side of FIG. 3) for illumination. The light guiding lenses 8 and 9 may be formed from a transparent, light-guiding material, such as an acrylic resin or a polycarbonate resin.

With reference to FIGS. 4A to 6, a description will now be given of the detailed configuration of the light guiding lens 9 constituting the DRL unit 6. The light guiding lens 9 can formed from a light guide plate. Here, the light guide plate of the light guiding lens 9 can include: a light guide plate main body 91 having a light output surface 91a; and a light entrance portion 9A that is formed to be continuous with the light guide plate main body 91 and can include a light incident portion 9B opposite to the LED light source 11 and upper and lower expanded portions 92 and 93.

Specifically, the light guide plate main body 91 of the light guiding lens 9 can have a triangular planar shape as illustrated in FIG. 6. The light entrance portion 9A can be formed integrally (continuous) with the light guide plate main body 91 at a deeper end of the light guide plate main body 91 (upper side in FIG. 6). The light entrance portion 9A can be made thick in the vertical direction (or the direction perpendicular to the plate surface direction) as illustrated in FIG. 5.

The light entrance portion 9A can include the upper and lower expanded portions 92 and 93 integrally formed on the top and bottom surface sides of the light entrance portion 9A. Further integrally included is a light incident portion 9B expanded in the plate surface direction (lateral direction) at the end portion of the light entrance portion 9A. The light incident portion 9B can have a truncated conical shape to have a light incident surface. The one LED light source 11 can be disposed in the vicinity of the light incident surface of the light incident portion 9B so that the light emission direction of the LED light source 11 is parallel to the plate surface direction (in the leftward direction of FIG. 6).

In this light guiding lens 9, the upper and lower expanded portions 92 and 93 formed integrally with the light entrance portion 9A can have asymmetric cross sections in the plate thickness direction as illustrated in FIG. 5, and have difference sizes in the top plan view as illustrated in FIG. 6. Specifically, the upper expanded portion 92 can have a smaller size than the lower expanded portion 93 when seen in the top plan view as illustrated in FIG. 6, and thus, the upper expanded portion 92 is enclosed within the lower expanded portion 93 when seen from above as illustrated in FIG. 6. Furthermore, the upper and lower expanded portions 92 and 93 may not have a similar planar shape, and have respective different planar shapes as illustrated in FIG. 6.

The light output surface 91a can be formed in a linear shape on an inclined front surface of the light guide plate main body 91 of the light guiding lens 9. Here, the front surface of the light guide plate main body 91 is inclined rearward as illustrated in FIG. 6. The linear light output surface 91a can be provided with a plurality of lens cuts 91a1. The lens cuts 91a1 can each have two side surfaces which extend in the direction of the thickness and one of which is parallel to the light output direction of the vehicle signaling light and the other of which is perpendicular to the light output direction (meaning that the lens cut 91a1 has a cross section having one side parallel to the light output direction and the other side perpendicular to the light output direction).

The light guide plate main body 91 and the upper and lower expanded portions 92 and 93 of the light guiding lens 9 can each have an inclined surface on the deeper side (upper side in FIG. 6). Each of the inclined surfaces can be provided with a plurality of reflective cuts 91b, 92a, 93a that are configured to reflect light rays, emitted from the LED light source 11 in a lateral direction (from the right side to the left side in FIG. 6) and directly incident thereon, to the light output surface 91a (downward in FIG. 6). As illustrated in FIG. 6, the positions (positions seen in the top plan view) of the reflective cuts 92a and 93a formed in the respective upper and lower expanded portions 92 and 93 can be different from one another. Then, the upper and lower expanded portions 92 and 93 can have outer surfaces 92b and 93b as illustrated in FIG. 6. The outer surfaces 92b and 93b can each function as a reflective surface configured to reflect light, having been reflected by the reflective cuts 92a and 93a, to the light guide plate main body 91.

In the DRL unit 6 having the light guiding lens 9 with such a configuration described above, a current is supplied to the LED light source 11 to emit light rays. Then, part of the light rays emitted from the LED light source 11 and travelling in the lateral direction parallel to the plate surface direction of the light guiding lens 9 (to the left side in FIG. 6) can be incident on the light incident surface (end surface) of the light incident portion 9B to enter the light entrance portion 9A. Then, the light rays can be reflected by the reflective cuts 91b, 92a, and 93a formed in the light guide plate main body 91 and the upper and lower expanded portions 92 and 93, respectively,so as to travel to the light output surface 91a (downward in FIG. 6). The light rays having been reflected by the reflective cuts 92a and 93a of the upper and lower expanded portions 92 and 93 can impinge on the outer surfaces 92b and 93b of the expanded portions 92 and 93 serving as reflective surfaces. Thus, the light rays can be reflected by the outer surfaces 92b and 93b toward the light guide plate main body 91 to enter the same. Then, the light rays can be repeatedly totally reflected within the light guiding plate main body 91 to travel to the light output surface 91a.

Almost all of the light rays toward the light output surface 91a can be projected through the light output surface 91a to the near side in FIG. 3 (downward direction in FIG. 6). At that time, the plurality of lens cuts 91a1 formed in the light output surface 91a can control the projection direction of the light rays to proper illumination directions (output directions) required as a vehicle signal light. As a result, the entire light output surface 91a of the light guiding lens 9 can be illuminated with light uniformly or can project light uniformly as if it emits light in a linear fashion. This can achieve the exhibition of the intrinsic function of the DRL unit 6.

In the vehicle signaling light according to this exemplary embodiment, the light guiding lens 8 of the turn signaling lamp unit 5 disposed on the upper side can have an outer shape except the upper expanded portion 92 of the light guiding lens 9 of the DRL unit 6 disposed on the lower side (the outer shape configured to avoid being overlaid on the upper expanded portion 92 of the light guiding lens 9). This configuration can achieve the close-contact arrangement of the light guiding lenses 8 and 9 as illustrated.

As described above, since the light guiding lenses 8 and 9 having respective different light receiving directions (light incident directions) are stacked on each other in the vehicle signaling light, the vehicle signaling light can be configured by arranging these light guiding lenses 8 and 9 adjacently. Thus, the vehicle signaling light with this configuration can realize the thin profile while having two functional light guiding lenses 8 and 9 of the turn signaling lamp unit 5 and the DRL unit 6.

Furthermore, since the upper light guiding lens 8 can have the outer shape configured to avoid being overlaid on the upper expanded portion 92 of the lower light guiding lens 9, the light guiding lenses can be arranged more closely, thereby realizing the thinner profile as a single vehicle signaling light having two functional lamp units, i.e., the turn signaling lamp unit 5 and the DRL unit 6.

Furthermore, in the DRL unit 5, the expanded portion of the light guiding lens 9 can be composed of the upper and lower expanded portions 92 and 93, which can be provided with respective reflective cuts 92a and 93a. Furthermore, the light guide plate main body 91 can be provided with reflective cuts 91b. These reflective cuts 91b, 92a, and 93a are configured to reflect light, which is directly incident thereon from the light source, to the light output surface 91a. Furthermore, the respective reflective cuts 92a and 93a of the upper and lower expanded portions 92 and 93 can be located in positions different from each other when seen in a vertical direction. This can achieve uniform illumination of the light output surface of the light guide plate main body 91 while preventing uneven illumination due to point illumination.

Furthermore, since the light output surfaces 8c and 91a of the light guiding lenses 8 and 9 of the turn signaling lamp unit 5 and the DRL unit 6 can be formed to extend linearly, the light can be output in a linear shape, so that the intrinsic functions of the turn signaling lamp unit 5 and the DRL unit 6 as the vehicle signaling light can be exhibited in the single vehicle signaling light.

Furthermore, since the light output surfaces 8c and 91a of the upper and lower light guiding lenses 8 and 9 are provided with a plurality of lens cuts 8c1 and 91a1, the light output through the light output surfaces 8c and 91a can be properly diffused by the plurality of lens cuts 8c1 and 91a1 to achieve uniform illumination thereof. Furthermore, one side surfaces of the lens cuts 8c1 and 91a1 that are parallel to the light output direction can reflect waste light back to the light guiding lenses 8 and 9. This can improve the light utilization efficiency.

Furthermore, the illustrated exemplary embodiment has dealt with the vehicle signaling light including the turn signaling lamp unit 5 and the DRL unit 6 including the respective light guiding lenses 8 and 9. However, the presently disclosed subject matter can encompass other exemplary embodiments of any vehicle signaling lights having similar light guiding lenses arranged vertically in a close-contact manner.

Furthermore, the individual light sources are provided corresponding to respective light guiding lenses in the previously illustrated exemplary embodiment, but this is not imitative. For example, a single light source with sufficient light amount may be used in combination with light guiding members such as optical fibers to deliver the light rays to respective light incident portions to serve as the first and second light sources.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle signaling light comprising:
   a first light source;
   a first plate light guiding lens;

a second light source; and a second plate light guiding lens, wherein the first plate light guiding lens includes a light incident portion to receive light emitted from the first light source in a direction parallel to a plate surface direction and a light output surface through which the light having been guided is allowed to exit, and the light incident portion has an expanded portion, the second plate light guiding lens receives light emitted from the second light source in a direction perpendicular to the plate surface direction and causes the light to exit from the light guiding lens in the direction parallel to the plate surface direction, the first and second plate light guiding lenses are stacked on each other, the expanded portion of the light incident portion comprises a lower expanded portion and an upper expanded portion having a smaller size than the lower expanded portion when viewed in a direction perpendicular to the plate surface direction, and the second light guiding lens is provided on the same side as that of the upper expanded portion and has an outer shape configured to avoid being overlaid on the upper expanded portion of the first light guiding lens.

2. The vehicle signaling light according to claim 1, wherein the upper and lower expanded portions, are provided with respective reflective cuts that are configured to reflect light, which is directly incident thereon from the first light source, to the light output surface and located in positions different from each other when seen in a vertical direction.

3. The vehicle signaling light according to claim 2, wherein the light output surfaces of the first and second light guiding lenses are formed to extend linearly.

4. The vehicle signaling light according to claim 3, wherein the light output surfaces of the first and second light guiding lenses are provided with a plurality of lens cuts having two side surfaces which extend in a direction of a thickness thereof and one of which are parallel to a direction in which the vehicle signaling light outputs light and the other of which are perpendicular to the direction in which the vehicle signaling light outputs light.

5. The vehicle signaling light according to claim 2, wherein the light output surfaces of the first and second light guiding lenses are provided with a plurality of lens cuts having two side surfaces which extend in a direction of a thickness thereof and one of which are parallel to a direction in which the vehicle signaling light outputs light and the other of which are perpendicular to the direction in which the vehicle signaling light outputs light.

6. The vehicle signaling light according to claim 1, wherein the light output surfaces of the first and second light guiding lenses are formed to extend linearly.

7. The vehicle signaling light according to claim 6, wherein the light output surfaces of the first and second light guiding lenses are provided with a plurality of lens cuts having two side surfaces which extend in a direction of a thickness thereof and one of which are parallel to a direction in which the vehicle signaling light outputs light and the other of which are perpendicular to the direction in which the vehicle signaling light outputs light.

8. The vehicle signaling light according to claim 1, wherein the light output surfaces of the first and second light guiding lenses are provided with a plurality of lens cuts having two side surfaces which extend in a direction of a thickness thereof and one of which are parallel to a direction in which the vehicle signaling light outputs light and the other of which are perpendicular to the direction in which the vehicle signaling light outputs lights.

9. A vehicle light comprising:

a housing having an opening;

a transparent outer lens configured to cover the opening of the housing to define a lighting chamber; and a plurality of lamps having different functions and included in the lighting chamber, wherein the plurality of lamps includes a first lamp having a first plate light guiding lens including a first light output surface and a second lamp having a second plate light guiding lens including a second light output surface, the first lamp has a first function achieved by light emission from the first light output surface, and the second lamp has a second function which is achieved by light emission from the second light output surface and is different from the first function, the first lamp includes a first light source and the first plate light guiding lens, the first plate light guiding lens includes a first light incident portion to receive light emitted from the first light source and the first light output surface through which the light having been entered through the first light incident portion into the first plate light guiding lens and totally reflected is allowed to exit and which is located at an end face of the first plate light guiding lens in a plate surface direction and is formed from a transparent light-guiding material, the second lamp includes a second light source and the second plate light guiding lens, the second plate light guiding lens includes a second light incident portion to receive light emitted from the second light source and the second light output surface through which the light having been entered through the second light incident portion into the second plate light guiding lens and totally reflected is allowed to exit and which is located at an end face of the second plate light guiding lens in the plate surface direction and is formed from a transparent light-guiding material, the first plate light guiding lens and the second plate light guiding lens are stacked on each other so that the first light output surface of the first lamp and the second light output surface of the second lamp are adjacent to each other in a plate thickness direction, the first light incident portion is formed integrally at an end face of the first plate light guiding lens so as to receive the light emitted from the first light source in the plate surface direction, and has an expanded portion expanded in the plate chicness direction and integrally formed to the first plate light guiding lens on a same side as the second plate light guiding lens which is stacked together with the first plate light guiding lens, the first plate light guiding lens further has a plurality of reflective cuts located at an end face at a position different from a position where the first light output surface is formed so as to reflect light emitted from the first light source and having entered into the first plate light guiding lens, the second light incident portion is formed integrally and projected in the plate thickness direction from a plate surface of the second plate light guiding lens on a side opposite to a side where the first plate light guiding lens is stacked on the second plate light guiding lens, the second plate light guiding lens has a reflective surface on a surface close to the first plate light guiding lens at a position facing to the second light incident portion, the reflective surface has a V-shaped cross section, the second plate light guiding lens further has a sideward reflective surface located at an end face at a position different from a position where the second light-emitting surface is formed so as to reflect light emitted from the second light source and having entered into the second plate light guiding lens and reflected sideward by the reflective surface, and the second plate light guiding lens has an outer shape configured to avoid being overlaid on the expanded portion of the first plate light guiding lens.

10. The vehicle light according to claim 9, wherein the first plate light guiding lens and the second plate light guiding lens are arranged to be in close contact with each other.

11. The vehicle light according to claim 9, wherein the first lamp is a DRL lamp.

12. The vehicle light according to claim 11, wherein the second lamp is a turn signaling lamp.

13. The vehicle light according to claim 9, wherein the second lamp is a turn signaling lamp.

14. The vehicle light according to claim 13, wherein the first and second light output surfaces of the first and second plate light guiding lenses are provided with a plurality of lens cuts having two side surfaces which extend in the plate thickness direction and one of which are parallel to a direction in which the vehicle light outputs light and the other of which are perpendicular to the direction in which the vehicle light outputs light.

15. The vehicle light according to claim 13, wherein the expanded portion of the first light guiding lens is composed of upper and lower expanded portions, which are provided with respective reflective cuts that are configured to reflect light, which is directly incident thereon from the first light source, to the first light output surface and located in positions different from each other when seen in a vertical direction.

16. The vehicle light according to claim 13, wherein the first and second light output surfaces of the first and second plate light guiding lenses are formed to extend linearly.

17. The vehicle light according to claim 9, wherein the expanded portion of the first plate light guiding lens is composed of upper and lower expanded portions, which are provided with respective reflective cuts that are configured to reflect light, which is directly incident thereon from the first light source, to the first light output surface and located in positions different from each other when seen in a vertical direction.

18. The vehicle light according to claim 17, wherein the first and second light output surfaces of the first and second plate light guiding lenses are formed to extend linearly.

19. The vehicle light according to claim 9, wherein the first and second light output surfaces of the first and second plate light guiding lenses are provided with a plurality of lens cuts having two side surfaces which extend in the plate thickness direction and one of which are parallel to a direction in which the vehicle light outputs light and the other of which are perpendicular to the direction in which the vehicle light outputs light.

* * * * *